United States Patent
Lyons

[19]
[11] Patent Number: 5,812,422
[45] Date of Patent: *Sep. 22, 1998

[54] COMPUTER SOFTWARE FOR OPTIMIZING ENERGY EFFICIENCY OF A LIGHTING SYSTEM FOR A TARGET ENERGY CONSUMPTION LEVEL

[75] Inventor: Damian M. Lyons, Putnam Valley, N.Y.

[73] Assignee: Philips Electronics North America Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 524,979

[22] Filed: Sep. 7, 1995

[51] Int. Cl.$^6$ .................................................. G02B 26/02
[52] U.S. Cl. .............................................................. 364/512
[58] Field of Search ................................... 395/500, 750, 395/200.05, 200.06, 221.9, 619, 200.1; 315/307, 156; 362/85; 364/512, 578, 139, 480, 481, 482, 483, 143, 146, 145, 492, 493, 505

[56] References Cited

U.S. PATENT DOCUMENTS

| | | | |
|---|---|---|---|
| 4,434,388 | 2/1984 | Carver et al. | 315/307 |
| 4,491,727 | 1/1985 | Appelbaum et al. | 250/203 |
| 4,510,398 | 4/1985 | Culp et al. | 307/35 |
| 4,965,492 | 10/1990 | Boldwyn | 315/156 |
| 4,980,806 | 12/1990 | Taylor et al. | 362/85 |
| 5,209,560 | 5/1993 | Taylor et al. | 362/85 |
| 5,250,799 | 10/1993 | Werner | 250/214 |
| 5,252,894 | 10/1993 | Bank et al. | 315/307 |
| 5,255,206 | 10/1993 | Pegis | 364/512 |
| 5,442,261 | 8/1995 | Bank et al. | 315/307 |
| 5,444,851 | 8/1995 | Woest | 395/200.1 |

FOREIGN PATENT DOCUMENTS

| | | | |
|---|---|---|---|
| 0447136 | 9/1991 | European Pat. Off. | H05B 41/36 |
| 0482680 | 4/1992 | European Pat. Off. | H05B 37/02 |
| 8905536 | 6/1989 | WIPO | H02J 13/00 |
| WO9522190 | 8/1995 | WIPO | H02J 3/14 |

OTHER PUBLICATIONS

Syslo, Deo & Kowalik, *Discrete Optimization Algorithms with Pascal Programs*, Prentice Hall, 1983, pp. 1–20.
Lyons, "Optimizing Building Lighting: Static Optimization that exploits priorities and building connectivity", pp. 1–8, 1995.

*Primary Examiner*—Kevin J. Teska
*Assistant Examiner*—Dan Fiul

[57] ABSTRACT

A method for optimizing the energy efficiency of a lighting system including a plurality of light sources, which includes the steps of defining a set of parameters for the lighting system, and using a linear programming technique, taking into account the set of parameters, to produce energy allocation output data which satisfies a total energy consumption constraint that the total energy allocated to the lighting system not exceed a target energy consumption level, and which is representative of an optimal allocation of energy to each of said light sources. The lighting system is installed in a building which includes a plurality of rooms each of which is equipped with at least one of the light sources. In general, the lighting optimization problem is translated into a linear programming problem by formulating a set of lighting system energy allocation constraints, converting these constraints into a set of constraint equations and a cost function, converting the constraint equations into a set of simultaneous linear equations, and then solving the set of simultaneous linear equations in such a manner as to minimize the cost function, to thereby produce the energy allocation output data, which is preferably in the form of an optimal brightness level for each light source. These steps are preferably implemented in computer software, which is preferably loaded in a programmable central controller of an intelligent lighting control system which is responsive to the energy allocation output data for automatically adjusting the brightness level of each of the light sources to the optimal brightness level therefor. Preferably, available energy remaining after satisfying minimum brightness levels for each room is allocated at least partially on the basis of the designated priority level of each room, and/or the energy efficiency of the light sources.

20 Claims, 1 Drawing Sheet

COMPUTER SOFTWARE FOR OPTIMIZING ENERGY EFFICIENCY OF A LIGHTING SYSTEM FOR A TARGET ENERGY CONSUMPTION LEVEL

BACKGROUND OF THE INVENTION

The present invention relates generally to automatic lighting systems for buildings, and, more particularly, to computer software (and method) which can be utilized in an intelligent lighting control system to optimize the energy efficiency and utilization of the building lighting resources for a given set of user-defined parameters, taking the building topology into account.

There are presently available at least two broad categories of automatic lighting control systems for buildings. Automatic lighting control systems falling into the first broad category consist of a plurality of discrete, self-contained automatic lighting control modules which operate essentially independently of one another for controlling the lighting conditions in respective separate rooms or localized areas of the building. Automatic lighting control systems falling into the second broad category employ a distributed network of sensors for detecting the illumination levels and/or presence of persons in each (or a selected subset) of the rooms (or other localized areas) in the building, and a programmable central controller which analyzes the sensor feedback signals in accordance with a lighting control program, and outputs control signals to adjust the lighting levels of the monitored rooms in the building in accordance with the lighting control program. In this connection, an automatic lighting control module(s) in each room or localized area is (are) operated under the control of the programmable central controller. Thus, rather than operating independently of one another, the distributed modules are functionally integrated into a single building-wide network under the control of the programmable central controller.

An exemplary automatic lighting control system of the first category is disclosed in European Patent Application Publication No. 0 447 136, published on Sep. 18, 1991. In this system, each light source is provided with an automatic control device which includes a presence detector (e.g., a motion detector or a passive infra-red detector) and a light intensity detector (e.g., a photocell detector). In operation, each automatic control device functions to switch its corresponding light source on when an occupant is detected in its localized area of coverage, and to vary the intensity (brightness) of the light produced by its corresponding light source in response to variations in the sensed ambient or background light level in its localized area of coverage. In this manner, adequate lighting is provided in all occupied areas despite variations in the ambient lighting conditions.

Another typical automatic lighting control system of the first category is disclosed in U.S. Pat. No. 5,250,799, issued to Walter Werner on Oct. 5, 1993. This system includes one or more individual dimming controllers each of which controls the light intensity (brightness) of one or more light sources in a room or localized area of the building which is lit by internal light and external light. In particular, each dimming controller adjusts the intensity of the internal light in dependence on the external light intensity, which varies with the time of day and atmospheric conditions. The intensity and direction of the external light is sensed by external light sensors. Each of the light sources in a room or localized area of the building can be provided with an individual dimmer, to thereby enable the intensity of the different light sources to be individually adjusted in such a manner as to provide either a uniform or non-uniform light intensity profile. In general, the light intensity of the internal light is controlled in substantially inverse dependence on the external light, e.g., when the external light decreases the light inside the room is made brighter.

A more advanced automatic lighting control system of the first category is disclosed in published European Patent Application No. 0 482 680, having a publication date of Apr. 29, 1992. This reference discloses a programmable illumination system which includes a plurality of individual illumination units each of which is provided with a programmable controller which functions to automatically adjust the light level of its associated illumination unit to a prescribed (programmed) light output level for each of a plurality of different illumination modes. Such an illumination system has particular utility in a space, such as a living room, office, or shop, in which various different tasks which require different lighting conditions are to be performed. An illumination mode is defined as a particular setting of the light output levels of all illumination units in a particular illumination area for providing a desired illumination profile for a particular task to be performed (or desired ambience) in that particular illumination area. After initial programming of the system, the system automatically adjusts the output levels of the individual illumination units to the proper level for a selected illumination mode. Such a programmable illumination system is commercially available as the Philips MCS-100 system. A wireless or hard-wired remote controller can be utilized to program each of the individual illumination units of the system.

An exemplary automatic lighting control system of the second category is disclosed in published PCT Application No. WO 89/05536, which has a publication date of Jun. 15, 1989. This system includes a programmable microprocessor-based central controller which is responsive to feedback signals produced by a network of presence and light sensors distributed throughout a building to automatically control the light output levels of lighting units in different rooms and/or zones of the building. The system is equipped with an override feature to enable building occupants to override one or more of the automatic lighting features of the system, e.g., to enable the lights to be turned off, despite the sensed presence of people in a room, for operation of an overhead projector (OHP).

A more advanced automatic lighting control system of the second category is disclosed in co-pending U.S. patent application Ser. No. 08/326,823, filed on Oct. 19, 1994. This system includes a plurality of illumination sensors distributed throughout the building, but advantageously not necessarily in a one-to-one relationship to the light sources distributed throughout the building. In this connection, a generally lesser number of illumination sensors than light sources are strategically placed inside (and outside, if desired) of the building in order to provide a non-redundant set of measurements of internal illumination. These measurements are then collectively processed by a central automatic control device which preferably includes a neural network or a fuzzy logic unit. The automatic control device is programmed with a set of inference rules chosen to meet user-defined comfort and/or energy efficiency criteria. In operation, the automatic control device automatically controls the light output levels of the light sources throughout the building in accordance with the user-defined inference rules to thereby meet the user-defined comfort and/or energy efficiency criteria. Various user-selectable customized usage modes can be programmed to enable building occupants to vary the general lighting conditions in a selected room(s) or area(s) of the building in accordance with various usage requirements by merely selecting the appropriate usage mode.

A major shortcoming of all presently known automatic lighting control systems is that none of them are designed to optimize the energy efficiency of a building lighting system for a target energy consumption level and a prescribed set of lighting system usage parameters and constraints. Thus, there presently exists a need in the art for an automatic lighting control system which overcomes this and other limitations, disadvantages, and shortcomings of the presently known automatic lighting control systems. The present invention fulfills this need.

SUMMARY OF THE INVENTION

The present invention encompasses a method for optimizing the energy efficiency of a lighting system which includes a plurality of light sources, which includes the steps of defining a set of parameters for the lighting system, and using a linear programming technique, taking into account the set of parameters, to produce energy allocation output data which satisfies a total energy consumption constraint that the total energy allocated to the lighting system not exceed a target energy consumption level, and which is representative of an optimal allocation of energy to each of the light sources. The lighting system is installed in a building which includes a plurality of rooms each of which is equipped with at least one of the light sources.

In general, the lighting optimization problem is translated into a linear programming problem by formulating a set of lighting system energy allocation constraints, converting these constraints into a set of constraint equations and a cost function, converting the constraint equations into a set of simultaneous linear equations, and then solving the set of simultaneous linear equations in such a manner as to minimize the cost function, to thereby produce the energy allocation output data, which is preferably in the form of an optimal brightness level for each light source. These steps are preferably implemented in computer software, which is preferably loaded in a programmable central controller of an intelligent lighting control system which is responsive to the energy allocation output data for automatically adjusting the brightness level of each of the light sources to the optimal brightness level therefor.

Preferably, available energy remaining after satisfying minimum brightness levels for each room is allocated at least partially on the basis of the designated priority level of each room, and/or the energy efficiency of the light sources. Further, rooms of equal priority are preferably allocated an equal amount of available energy. Also, the method preferably includes a post-processing filtering step for determining whether the optimal brightness level for each room served by a utility room(s) is equal to a minimum brightness level, and, if so, adjusting the optimal brightness level for the utility room(s) to the minimum brightness level.

BRIEF DESCRIPTION OF THE DRAWING

These and various other features and advantages of the present invention will be readily understood with reference to the following detailed description taken in conjunction with the accompanying drawing, in which.

DETAILED DESCRIPTION OF THE INVENTION

Figure 1:
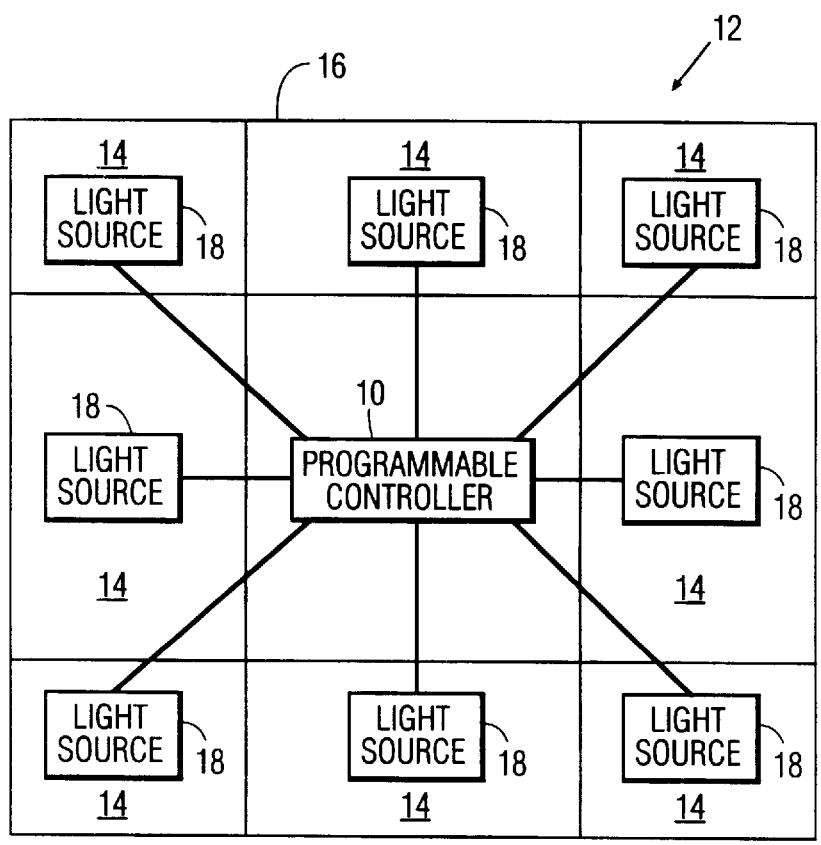
FIG. 1 is a block diagram depicting an intelligent lighting control system embodying the present invention.

With reference now to FIG. 1, it is presently contemplated that the computer software of the present invention will be installed in a central programmable controller 10 of an intelligent (automatic) lighting control system 12 for a building 16, to thereby facilitate programming of the operation thereof. In this connection, the computer software produces output data that is utilized by the intelligent lighting control system 10 to automatically adjust the output level or brightness of the light source(s) 18 in each monitored room 14 (or other localized area or zone) in the building 16 in accordance with the lighting optimization/energy allocation algorithm implemented by this computer software, which will be described in detail hereinafter. However, the present invention can be embodied as stand-alone computer software which can be used by a building/facilities manager to provide him/her with information regarding the most efficient distribution of lighting energy resources within a building for a target energy consumption level and a given set of lighting system parameters and usage constraints. The manager can then use this information to manually adjust the settings of various light sources in different areas of the building, or to program a centralized intelligent lighting control system for the building, or to program self-contained automatic lighting control modules distributed throughout the building.

The basic approach of the present invention is to convert the lighting optimization problem to a linear programming problem which can be solved by any number of presently available linear programming software modules. In the ensuing description, two basic assumptions are made, namely, (1) that there is one lamp (light source) 18 per room 14 (or localized area) of the building 16 to be monitored, and (2) that the power-to-brightness relationship for each light source 18 is linear. The first assumption is made solely for the purpose of simplifying the description of the present invention, and is not in any way limiting to the present invention. The second assumption allows the lighting optimization problem to be translated into a linear programming problem. In practice, this assumption is sound, and is supported by the power-to-brightness data for various different types of dimmable light sources, e.g., a dimmable ballast lamp.

The initial step in formulating a lighting optimization algorithm is to define a set of parameters and constraints for the lighting system. Although the present invention is described below in connection with a presently preferred set of parameters and constraints, it should be clearly understood that the specific set of parameters and constraints which are utilized in the practice of the present invention, and the values therefor, are not limiting to the present invention, in its broadest sense, and, in fact, will be largely dependent upon user preferences. Thus, the lighting optimization algorithm can be modified or customized for any particular application.

In accordance with the presently preferred embodiment of the present invention, these parameters and constraints are as follows. First, a minimum and maximum brightness level for each room is defined. The maximum brightness level for each room 14 can be the maximum level desired by an occupant or a building-wide default level. The minimum brightness level for each room 14 can be the minimum level desired by an occupant, a building-wide default level (e.g., 0), or some official minimum level, e.g., as may be mandated by OSHA, a local or municipal ordinance, or the like. In any event, the specific values selected for the minimum and maximum brightness levels are not limiting to the present invention.

The brightness constraint for each room 14 in the building 16 can be expressed by the following inequality (1):

For all $r_i \in R$, $l_{ri} \leq b_{ri} \leq u_{ri}$, (1)

where R represents the entire set of rooms 14 in the building 16, $r_i$ represents a given room 14 within the set R, $u_{ri}$ represents the maximum light level for that room $r_i$, $l_{ri}$ represents the minimum light level for that room $r_i$, and $b_{ri}$ represents the brightness of that room $r_i$ (i.e., the brightness of the controllable light source or lamp in that room $r_i$). The total number or rooms $r_i$ in the entire set R is represented by n. Thus, i has a range of 1 through n.

Since it is assumed that there is a linear relationship between brightness and power consumed by each lamp, the total power $P_{ri}$ consumed by each lamp (room) in the building can be expressed by the following equation (2):

$$P_{ri} = p_{ri} b_{ri} + c_{ri}, \qquad (2)$$

where $p_{ri}$ is a linear power efficiency coefficient for each room $r_i$, and $c_{ri}$ is an offset constant. That is, the power $P_{ri}$ consumed by the lighting in each room $r_i$ is the linear power efficiency coefficient $p_{ri}$ for the lamp in that room times the brightness $b_{ri}$ for that room, plus some offset constant $c_{ri}$. Although the linear power efficiency coefficient $p_{ri}$ for each room $r_i$ is a constant, the value of this constant may vary from lamp to lamp, depending upon the power or energy efficiency thereof. In this regard, the less steep the slope of the brightness-to-power line for a lamp, the more efficient the lamp, and thus, the lower the linear power efficiency coefficient $p_{ri}$ for that lamp.

The total power $P_T$ consumed by the lighting system of the entire building can be expressed by the following equation (3):

$$P_T = \sum_{i=1}^{n} (p_{ri} b_{ri} + c_{ri}). \qquad (3)$$

The total energy $E_T$ consumed over a time interval t is equal to the total power $P_T$ times t, assuming that the power is constant over the interval t. In the case of a unit interval, power consumed and energy are the same, i.e., $E_T = P_T$. For the sake of simplicity, a unit time interval, which can be thought of as one time zone of the building lighting schedule, will be assumed. To convert to true energy units, the power needs to be multiplied by the duration of the time zone over which the energy is being calculated.

The standard form of a linear programming problem is:

Given Ax=B, find x such that MIN (Cx), (4)

where A is an n×m matrix, B is an n row vector, and C is an m column vector. All of the coefficients must be greater than or equal to zero. In general, the objective is to solve the linear programming problem by finding a value for the control (dependent) variable x which minimizes the cost function Cx. In the present case, the cost C is the energy consumption of the building lighting system, and the control variable x is the brightness level $b_{ri}$ (i.e., light output level) of the lights constituting the building lighting system.

In order to convert or translate the lighting optimization problem into a linear programming problem, the expressions (1) and (3) must be modified as follows. Namely, first slack variables $s_{uri}$ (slack variable for the upper bound of room $r_i$) and $s_{lri}$ (slack variable for the lower bound of room $r_i$) need to be introduced in order to convert the expression (1) from a single inequality expression into the following two equalities, (5) and (6):

$b_{ri} + s_{uri} = u_{ri}$, for some $s_{uri}$ (5)

$b_{ri} - s_{lri} = l_{ri}$, for some $s_{lri}$ (6)

The A matrix of the linear programming problem can be composed of the left-hand sides of the equations (5) and (6) for each room $r_i$ of the building 16, and the B vector can be composed of the right-hand sides of the equations (5) and (6) for each room $r_i$ of the building 16.

The cost vector C is derived by modifying the left-hand side of equation (3) by adding thereto the slack variables introduced in the equations (5) and (6) above (with zero coefficients), and by introducing thereto the target energy consumption level E, to thereby yield the following expression (7):

$$\sum_{i=1}^{n} (p_{ri} b_{ri} + c_{ri} + 0 \cdot s_{uri} + 0 \cdot s_{lri}) - E. \qquad (7)$$

Thus, the lighting optimization problem has been translated into a linear programming problem given by equations (5), (6), and (7). The linear programming problem can then be implemented in software using any convenient, readily available linear programming software tool, and then solved by using any convenient, readily available linear programming solver software module, as will be more fully developed hereinafter.

Formulating and solving the linear programming problem in terms of the equations (5), (6), and (7) provides brightness setting data (i.e., the value of $b_{ri}$) for each of the rooms 14 in the building 16 which will result in the most efficient distribution of lighting resources within the building 16 for the target energy consumption level E, given the constraints imposed by these equations. More particularly, if the linear power efficiency coefficient $p_{ri}$ for the lamp 18 in at least two or more of the rooms 14 in the building 16 differs, then the rooms 14 which have lamps 18 which are more energy efficient will be allocated a disproportionate share of the energy, for the following reasons. Namely, since the value of the linear power efficiency coefficient $p_{ri}$ for a high efficiency lamp is lower than that for a low efficiency lamp, and the linear power efficiency coefficients $p_{ri}$ are used as coefficients of brightness in the cost equation, then rooms having lower efficiency lamps are accorded greater "weight" in the cost equation than rooms having higher efficiency lamps. Thus, since the linear programming problem is solved by minimizing the cost vector C represented by expression (7), then the rooms having higher efficiency lamps are allocated a greater amount of energy than rooms having lower efficiency lamps.

However, if the linear power efficiency coefficient $p_{ri}$ for the lamp 18 in each room 14 is the same (e.g., the same type of lamp 18 is used in each room 14 in the building 16), then any "extra" or "spare" energy that remains after the minimum brightness level constraint for each room 14 is satisfied, is distributed arbitrarily amongst the rooms 14 in the building 16. This would be equivalent to setting the linear power efficiency coefficient $p_{ri}$ for the lamp 18 in each room 14 to 1, thus effectively eliminating the power or energy efficiency of the lamps 18 as a factor in the allocation of energy to the lighting resources in the building 16. Thus, the only useful information that is provided to the building/facilities manager in this case is whether the target energy consumption level E is sufficient to meet the minimum brightness level requirements for each room 14 over the relevant time interval.

Although this limited amount of information may be all that is required in some instances, it is desirable to introduce additional constraints regarding the building topology into the linear programming problem in order to facilitate the provision of more useful information regarding the optimal distribution of energy throughout the lighting system, i.e., regarding the optimal brightness level for each room 14 in the building 16.

In this regard, formulating and solving the linear programming problem in terms of the equations (5), (6), and (7) does not take into account the relative "priority" of the rooms 14 in the building 16. For example, the light source (lamp) in an executive office is accorded the same priority regarding allocation of energy as is the light source (lamp) in a seldom-used janitorial supply room. This is because the linear power efficiency constant $p_{ri}$ for the lamp 18 in each room $r_i$ only takes into account the relative power or energy efficiency of that lamp, and does not at all take into account the relative importance of the room to the building occupants. Clearly, it would be advantageous to take into account the relative importance of the rooms 14 in the building 16 from a usage standpoint in allocating the energy resources to the various rooms in the building lighting system. By doing so, any spare or extra energy remaining after satisfying the minimum brightness level constraint could be allocated to the various rooms 14 of the building lighting system on the basis of the relative importance thereof to the building occupants, in addition to (or in lieu of) being allocated on the basis of the energy efficiency of the lamps 18 employed in the various rooms 14 of the building 16.

Such a room priority constraint can be incorporated into the light optimization/linear programming problem as follows. First, each room $r_i$ is assigned a priority level $pr_{ri}$ which is greater than or equal to zero. The higher the priority of a room, the lower the value of $pr_{ri}$ for that room. Thus, if a room r1 is given a higher priority than a room r2, then $pr_{r1} < pr_{r2}$. Second, a modified cost vector C' is derived as follows. Namely, an additional slack variable $s_e$ is introducted into the expression (7) which represents the original cost vector C, thereby yielding the following equation (8):

$$\sum_{i=1}^{n} (p_{ri}b_{ri} + 0 \cdot s_{uri} + 0 \cdot s_{lri}) - s_e = E - \sum_{i=1}^{n} c_{ri}. \quad (8)$$

The expression (8) derived from the original cost vector C becomes an additional linear programming constraint. The additional slack variable $s_e$ is used to ensure that all of the available (allotted) energy E is actually used. However, in order to ensure that no more than the available energy E is used, this slack variable is minimized in the new cost vector C'.

The priority constraint is incorporated into the linear programming problem by substituting the priority level $pr_{ri}$ for each room for the linear power coefficient $p_{ri}$ in the expression (7) which represents the original cost vector C, to thereby yield the following expression (9) which represents the new cost vector C':

$$\sum_{i=1}^{n} (pr_{ri}b_{ri} + 0 \cdot s_{uri} + 0 \cdot s_{lri}) + s_e \quad (9)$$

The linear programming problem can now be phrased in terms of the equations (5), (6), (8), and (9), with the A matrix being composed of the left-hand sides of the equations (5), (6), and (8), the B vector being composed of the right-hand sides of the equations (5), (6), and (8), and the new cost vector C' being represented by the equation (9). Since the value of the priority level $pr_{ri}$ of a low priority room is higher than the value of the priority level $pr_{ri}$ of a high priority room, and the priority levels $pr_{ri}$ are used as coefficients of brightness in the new cost vector C' equation (9), then the low priority room is accorded greater "weight" in the cost equation than is the high priority room. Thus, since the linear programming problem is solved by minimizing the cost vector C', the high priority room is allocated a greater amount of energy than is the low priority room.

Thus, formulating and solving the linear programming problem in terms of the equations (5), (6), (8), and (9) provides a set of brightness values $b_{ri}$ for the rooms 14 in the building 16 which takes the relative priority of the rooms fully into account. Thus, the extra or spare energy which remains after the minimum brightness constraint has been met is allocated to the rooms 14 in the building lighting system on the basis of their relative importance or priority, e.g., as defined by the building occupants, in addition to (or in lieu of) being allocated on the basis of the energy efficiency of the lamps 18 employed in the rooms 14 of the building lighting system. This feature of the present invention can be utilized to enhance the intelligence of an intelligent automatic lighting control system.

With this formulation of the linear programming problem, rooms of equal priority may not be accorded equal brightness, since any excess energy is arbitrarily distributed amongst rooms of equal brightness. If it is important that rooms of equal priority get equal brightness, then an additional set of constraints must be introduced to the linear programming problem. For example, if rooms r1 and r2 are assigned equal priority (i.e., $pr_{r1} = pr_{r2}$), then the following constraint (10) must be introduced:

$$pr_{r1} = pr_{r2} \Leftrightarrow br_{r1} = br_{r2} \quad (10)$$

In general, the above constraint must be introduced for each set of equal priority rooms in order to ensure that all rooms of equal priority are allocated the same brightness level. This adds an extra set of constraint equations to the linear programming problem, but doesn't introduce more variables. In the worst case, all of the rooms 14 will be assigned the same priority, in which case, N−1 additional constraint equations will be required. In the best case, no two rooms will be accorded the same priority, in which case, no additional constraint equations will be required.

Now that the lighting optimization problem has been translated into a linear programming problem of standard form (i.e., Given Ax=B, find x such that MIN (Cx)), it is a routine matter to implement the lighting optimization algorithm represented thereby in computer software using any number of readily available software programming tools. All that is required is that the parameters (i.e., independent and dependent variables, and constants) be defined, and that the linear programming constraint equations be coded in a form recognizable to the particular linear programming solver software module to be used, e.g., any one of a wide array of well-known (and commercially available) linear programming solver software modules.

In the present instance, assuming the linear programming problem is formulated in terms of the equations (5), (6), (8), and (9), which define the A matrix, B vector, and C vector, then all that is required is that these equations be coded in the proper form, and that the parameters (i.e., independent and dependent variables, and constants) used therein be defined. More particularly, in this case, the independent variables which must be defined are the maximum and minimum brightness levels for each room (i.e., $u_{ri}$ and $l_{ri}$), the linear power efficiency coefficient for each lamp (room) in the building lighting system (i.e., $p_{ri}$), the priority level for each room (i.e., $pr_{ri}$), and the target energy consumption level (i.e., E). Although it is possible that the values for these variables would be embedded in the software, it is presently contemplated that these values will be user-defined (e.g., by the building/facilities manager). In this regard, the software can be designed with a user interface which provides a screen prompt to the user to input the value for each of these independent variables (and for the offset constant $c_{ri}$). Also, the number n of rooms 14 in the building lighting control system must be defined. The dependent variables which must be defined are the slack variables (i.e., $s_{uri}$, $s_{lri}$, and $s_e$). The other dependent variable is the brightness level for each room (i.e., $b_{ri}$), which is the control variable, i.e., the value for this variable for each room is the output of the program. In this connection, the basic purpose of the software of the present invention is to produce these outputs, which represent the optimum brightness levels for each room in the building lighting control system for the defined target energy consumption level E, over a unit time interval, taking into account the above-discussed parameters and usage constraints represented by the linear programming equations.

The source code which defines the parameters and the linear programming equations can be referred to as the "lighting optimization module". The source code which converts these linear programming equations into a set of simultaneous linear equations and solves the same can be referred to as the "linear programming module". As previously mentioned, translating the linear programming equations into a suitable code for the linear programming module is a routine matter for anyone having any degree of familiarity with computer programming, and certainly for a person of ordinary skill in the art to which this invention pertains. As was also previously mentioned, linear programming modules are widely and readily available from a variety of sources, e.g., basic computer programming textbooks, commercial software vendors, computer software libraries, etc.

The lighting optimization module and the linear programming module together comprise the computer software of the present invention. The source code of the lighting optimization module used in an exemplary embodiment of the present invention is attached hereto as Appendix 1. The source code of the linear programming module used in this exemplary embodiment of the present invention is attached hereto as Appendix 2. Both the lighting optimization modules and the linear programming module are written in C-language source code. The linear programming module is a linear programming solver program taken from a textbook entitled "*Discrete Optimization Algorithms with Pascal Programs*", by Syslo, Deo, and Kowalik (Prentice Hall, 1983), which uses the well-known "simplex" method for solving linear programming problems. With respect to the lighting optimization module, the linear programming problem is formulated in terms of the equations (5), (6), (8), and (9) defined hereinabove. With this formulation, since there are n rooms in the building, then there will be 2n bounds constraints, plus one energy level constraint, i.e., a total of 2n+1 constraint equations in the linear programming problem. There will be n room variables in the linear programming problem, plus two slack variables per room, plus one slack energy variable, i.e., a total of 3n+1 variables in the linear programming problem. The A matrix will have the dimensions of 2n+1 (n)×3n+1(m). The B column vector will be 2n+1 rows long, and the C row vector will be 3n +1 columns long.

The lighting optimization module of the present invention is also preferably designed to "filter" the optimum room brightness values output by the linear programming module by taking room connectivity into account to save energy, whenever possible. More particularly, if the optimum room brightness value output by the linear programming module for each room served by (i.e., "connected to") a "utility room", such as a hall, restroom, common area, or the like, is at its minimum level (e.g., 0), then the "filter" portion of the lighting optimization module will adjust the optimum brightness value for that utility room to its minimum level, if it is not already at this level. The source code for this "filter" portion of the linear optimization module of the above-described exemplary embodiment of the present invention is identified as "Utility Room (Topology) Code" in Appendix 1 attached hereto. The filter algorithm represented thereby can be simply expressed as follows. Namely, for each utility room $r_u$ in the set U of utility rooms in the building, if for each room $r_s$ of the set of rooms S served thereby (i.e., "connected" thereto), $b_r=1_r$, then set $b_{ru}=1_{ru}$.

Although a presently preferred embodiment of the present invention has been described in detail hereinabove, it should be clearly understood that many variations and/or modifications of the basic inventive concepts herein taught which may appear to those skilled in the pertinent art will still fall within the spirit and scope of the present invention, as defined in the appended claims. In this regard, the terms "building", "room", and "light source" are used in their broadest possible sense. For example, the term "building" is intended to encompass any structure which has a lighting system, including, but not limited to, single-family homes, multi-family dwellings, apartment buildings, office buildings, warehouses, factories, gymnasiums, auditoriums, theaters, museums, shops, restaurants, hotels, shopping malls, and indoor stadiums. The term "room" is intended to encompass any identifiable, separately lighted portion, zone, sector, or localized area of a building, including, but not limited to, conventional rooms such as offices, bathrooms, closets, storage areas, factory floors, basements, conference rooms, foyers, common areas, utility rooms, or any associated set of such separately lighted portions or zones, sectors, or localized areas of the building whose lighting is intended to be commonly controlled. The term "light source" is intended to encompass not only individual lamps, but also any associated set or group of lamps which are intended to be commonly controlled, e.g., all of the lamps associated with a given room in the building. Further, the particular type of light source, lighting system, or lighting control system employed in connection with the practice of the present invention is not limiting thereto.

APPENDIX 1

```
#define MAXVARS   (3*MAXROOMS+2)   /* MAXROOMS is in optlit.h; these */
#define MAXEQS    (2*MAXROOMS+2)   /* two are proportional to MAXROOMS */

/* routine to calculate current energy usage */
/* INPUT - Nr is number of rooms (i.e. size of arrays)
           R  is the room brightness array; each entry is the brightness
              of the room that its index into the array represents
           P  is the room power factor array; each entry is the power factor
              of the lamp in the room represented by the index */
/* OUTPUT - returns the energy consumed by all rooms FOR ONE TIME UNIT */ double optlit_usage(Nr,R,P)
 int Nr;
 Roomarray R,P;
{ int i;
  double E=0.0;

for (i=1; i<=Nr; i++) E += R[i]*P[i];

return E;
}
/* routine to optimize room brightnesses */
/* INPUT - Nr  Nr is number of rooms (i.e. size of arrays)
           U   is the upper brightness bound for each room.
           L   is the lower brightness bound for each room.
           P   is the power factor for the lamp in each room.
           Q   is the is priority for each room (the lower the better).
           E   is the TARGET energy level. */
/* OUTPUT - R  is the room brightness array; each entry is the optimal
              brightness of the room represented by the index of this
              entry given all the input constraints. */ int optlit_1f1t(Nr,U,L,P,Q,E,R)
     int Nr;                    /* number of rooms */
     Roomarray U,L,             /* upper and lower brightness bounds */
               P,               /* power factor */
               Q;               /* priority */
     double E;                  /* overall energy target */
     Roomarray R;               /* resultant optimal brightnesses */

{ double UE,LE;                 /* summed upper and lower energy bounds */
  int i,j;      /* misc index variables */ int M,N,                   /* Simplex- #const, #vars           */
         NoFeas,NoSol;          /*          result flags            */
         double Eps;            /*          threshold               */
         ArrM2N A;              /*          Simplex LHS A matrix    */
         ArrM2  B;              /*          Simplex RHS B matrix    */
         ArrN   C;              /*          Simplex cost vector     */
         ArrM2  X;              /*          Simplex result values   */
         ArrM   W;              /*          Simplex result pointers */
         double F;              /*          Simplex optimal cost    */

/* start by doing some error checking */ if (Nr>MAXROOMS)
   { printf("OPTLIT: Sorry, max rooms is %d\n",MAXROOMS); return -1; }

/* evaluate upper & lower bounds, to determine if E is even possible */

UE = optlit_usage(Nr,U,P);  /* the maximum consumed energy condition */
LE = optlit_usage(Nr,L,P);  /* the minimum consumer energu condition */
```

```
if ((E>UE)||(E<LE))
  { printf("OPTLIT: Sorry, energy is out of bounds.\n"); return -1; }

/*printf("OPTLIT - Setting up room bounds equations.\n");*/

/* Transfer the room bounds equations into the A matrix */
for (i=1; i<=Nr; i++)
  { for (j=1; j<=3*Nr+1; j++)
      A[i+Nr][j] = A[i][j] = 0.0;           /* zero all vars in two eqs*/
    A[i][i]    = 1.0;    A[i][i+Nr]   = 1.0; /* except this + upper slack */
    A[i+Nr][i] = 1.0;    A[i+Nr][i+2*Nr]= -1.0; /* and this + lower slack */
  }

/*printf("OPTLIT - Calculating energy level equation.\n");*/

/* Now set up the total energy consumption equation */
i = 2*Nr+1; /* equation row number for this */
for (j=1; j<=Nr; j++)    A[i][j] = P[j];    /* rooms powers */
for (j=Nr+1; j<3*Nr; j++) A[i][j] = 0.0;    /* u/l slacks */
A[i][3*Nr+1] = -1.0; /* energy level slack */

/*printf("OPTLIT - Constraint equation matrix done (no priority eqs).\n");*/

/* for total-ordering of priorities, will need to add extra constraint
     equations that enforce equal-priority=>equal brightness.
     This is NOT DONE YET. */

/*printf("OPTLIT - Calculating LHS B matrix.\n");*/

/* establish RHS for all constraint equations set up so far */
for (i=1; i<=Nr; i++)
  { B[i]=U[i]; B[i+Nr]=L[i]; } /* upper and lower rhs */
B[2*Nr+1] = E;                 /* energy level rhs */

/*printf("OPTLIT - Calculating cost vector.\n");*/

/* set up the cost vector, using priorities */
for (i=1; i<=Nr; i++)       C[i]=Q[i]; /* room variables */
for (i=Nr+1; i<=3*Nr; i++)  C[i]=0.0;  /* u/l slacks */
C[3*Nr+1] = 1.0; /* energy level slack */

/* set up the num constraints/num variables for simplex */

M=2*Nr+1; /* num eqs */
N=3*Nr+1; /* num vars */
Eps=1E-04; /* zero threshold */

/*optlit_printlp(M,N,A,B,C); *//* print the LP program */

/*printf("OPTLIT - Calling Simplex-LP for room brightness.\n");*/

/* NOW call simplex to solve this set of equations */

PSimplex(&M,&N,&Eps,A,B,X,C,W,&F,&NoFeas,&NoSol);

if (NoFeas==TRUE)
   { printf("OPTLIT: No Feasible Solution.\n"); return -1; }
   else if (NoSol==TRUE)
      { printf("OPTLIT: No solution, unbounded cost.\n"); return -1; }
   else
     { /* now set R to optimal values */
       for (i=1; i<=M; i++) R[i]=0.0; /* clean it first */
       for (i=1; i<=M; i++)
         if (W[i]<=Nr) /* a room variable in basis */
            R[ W[i] ] = X[i]; /* W is index, X is value of that index */
       return 0;
```

```
}
/* routine to print out the matrices for an LP problem */
/* INPUT - M     Number of csontraint eqs
           N     Number of variables
           A,B,C Simplex: MINIMIZE(C) subj to Ax=B */
void optlit_printlp(M,N,A,B,C)
 int M,N;
 ArrM2N A;
 ArrM2  B;
 ArrN   C;

{int i,j;

printf("\nOPTLIT - LP program is as follows - \n");

printf("Number of constraints: %d\n",M);
printf("Number of variables:   %d\n",N);
printf("A=\n");

for (i=1; i<=M; i++)
    { printf("Eq %d:",i);
      for (j=1; j<=N; j++) printf("%6.2f ",A[i][j]);
      printf("\n");
    }
  printf("\nB=\n");
  for (i=1; i<=M; i++) printf("%6.2f ",B[i]);
  printf("\nC=\n");

for (i=1; i<=N; i++) printf("%6.2f ",C[i]);
  printf("\n\n");

}

/*************************************************************/
/*************************************************************/
/*                                                           */
/* UTILITY ROOM (TOPOLOGY) CODE BELOW                        */
/*************************************************************/
/*************************************************************/

/* create a utility room structure from the data given */

Utilityroom opttop_create_utility(util,numrooms,rooms)
  int util,           /* the utility room index */
      numrooms,       /* number of dependant rooms */
      *rooms;         /* array of dependent rooms */
{Utilityroom u; int i;

u = (Utilityroom)malloc(sizeof(Utilitystruct));
  if (u==NULL)
    { fprintf(stderr,"OPTTOP: Cannot allocate utility room %d\n",util);
      return NULL;
    }
```

```
u->utility = util;
u->num_dependants = numrooms;
u->dependants = (int *)malloc(sizeof(int)*numrooms);
if (u->dependants==NULL)
  { fprintf(stderr,"OPTTOP: Cannot allocate utility list %d\n",util);
    free(u);
    return NULL;
  }
for (i=0; i<numrooms; i++)
u->dependants[i]=rooms[i];

return u;

Utilityroom urooms[];
  int num_urooms,target;
{int j,found=FALSE;

for (j=0; j<num_urooms; j++) found = (urooms[j]->utility==target);
  return found;

}

/* test if target is in the depndent list for any utlity room */ int opttop_in_utility_list(urooms,num_urooms,target)
  Utilityroom urooms[];
  int num_urooms,target;
{int j,i,found;
 found = FALSE;
 for (j=0; j<num_urooms && !found; j++)
   for (i=0; i<urooms[j]->num_dependants && !found; i++)
     found = (urooms[j]->dependants[i]==target);
 if (found) return j;
 else return -1;
}

/* This routine checks each of the dependent rooms for all utility
rooms. If all the rooms are turned off, then the utility room
is turned to its lowest level, possibly saving some energy */ int opttop_filter_utility_rooms(urooms,num_urooms,R,L)
  Utilityroom urooms[];
  int num_urooms;
  Roomarray R,L;
{int i,j,allempty; Utilityroom this_uroom;

for (i=0; i<num_urooms; i++)
    { allempty = TRUE; this_uroom = urooms[i];
      for (j=0; j< this_uroom->num_dependants && !allempty; j++)
        allempty = ( R[this_uroom->dependants[j]]==0 );
      if (allempty)
        { /*printf("OPTTOP-FILTER: utility room %d set to min\n",
                   this_uroom->utility);*/
          R[ this_uroom->utility ]=L[  this_uroom->utility ];
        }
/* free the space assigned to the utility room structure */

Utilityroom opttop_destroy_utility(u)
  Utilityroom u;
{
  if (u->dependants!=NULL) free(u->dependants);
  free(u);
}

/* test if target is a utility room */ int opttop_is_utility_room(urooms,num_urooms,target)
```

APPENDIX 2

```
/*====================================================================*/
/*                                                                    */
/* PROCEDURE SUMMARY :   This procedure solves the LP problems in     */
/*                       standard form:                               */
/*                                                                    */
/*             minimize           (c^T) x                             */
/*             subject to         Ax = b     (where b is non-negative)*/
/*                                           x >= 0                   */
/*                                                                    */
/*====================================================================*/
/*                                                                    */
/* PROCEDURE PSIMPLEX INPUT  : --->                                   */
/*    1. The number of constraints (M)                                */
/*    2. The number of variables                                      */
/*    3. A small real number, assigned to the variable (Eps), such that */
/*       if for any real number 'a',[a] < Eps, then a = 0;            */
/*    4. Array A[1..M, 1..N] of the left-hand-side coefficients of Ax=b; */
/*       additionally the rows M + 1 and M + 2 of this array are used */
/*       in the procedure to compute the relative cost vector         */
/*    5. Array B[1..M]. Additionally the elements B[M + 1] and B[M = 2] */
/*       are used for intermediate computations                       */
/*    6. Array C[1..N], the cost array                                */
/*                                                                    */
/*                                                                    */
/* PROCEDURE PSIMPLEX OUTPUT : --->                                   */
/*    1. The boolean variable "NoFeas" equal to TRUE if there is no   */
/*       solution, and FALSE, otherwise                               */
/*    2. The boolean variable "NoSol" equal to TRUE if the objective  */
/*       function is unbounded, and FALSE, otherwise                  */
/*    3. W[1..M] array identifying the optimal basic values           */
/*    4. X[1..M2] array whose first M elements give the optimal basic */
/*       solution (X[I] is the value of the variable numbered W[I]).  */
/*    5. F, which represents the optimal value of the objective function */
/*====================================================================*/ include <stdio.h> include <string.h> include "simplex.h"

void PSimplex(M,N,Eps,A,B,X,C,W,F,NoFeas,NoSol)

int *M;
                    int *N;
                    double *Eps;
                    ArrM2N A;
                    ArrM2 B;
                    ArrM2 X;
                    ArrN C;
                    ArrM W;
                    double *F;
                    int *NoFeas;
                    int *NoSol;

{
    int I, J, K, L, P, Q;
    double D, R, S;
    ArrM2M2 U;
    ArrM2 Y;
    int Ex, Phase, Stop;
```

```
*NoFeas = FALSE;
*NoSol = FALSE;
P = *M + 2;
Q = *M + 2;
Phase = TRUE;
K = *M + 1;
for(J = 1;J<=*N;J++)
   {
     A[K][J] = C[J];
     S = 0.0;
     for (I = 1;I<=*M;I++)
         S = S - A[I][J];
     A[P][J] = S;
   }
S = 0.0;
for(I = 1;I<=*M;I++)
   {
     W[I] = *N + I;
     R = B[I];
     X[I] = R;
     S = S - R;
   }
X[K] = 0.0;
X[P] = S;
for (I = 1;I<=P;I++)
   {
     for (J = 1;J<=P;J++)
        U[I][J] = 0.0;
     U[I][I] = 1.0;
   }
Stop = FALSE;
do
   {          /* UNTIL STOP - PHASE 1 */
     if ((X[P] >= -*Eps) && (Phase))
        {
          Phase = FALSE;
          Q = *M + 1;
        }
     D = 0.0;      /* PHASE 2 */
     for (J = 1;J<=*N;J++)
        {
          S = 0.0;
          for (I = 1; I<=P;I++)
             S = S + U[Q][I] * A[I][J];
          if (D > S)  {  D = S; K = J;  }
        }
     if (D > -*Eps)
        {
          Stop = TRUE;
          if (Phase) *NoFeas = TRUE;
        } else *F = -X[Q];
   }
   else
   {
     for (I = 1;I<=Q;I++)
        {
          S = 0.0;
          for (J = 1;J<=P;J++)
             S = S + U[I][J] * A[J][K];
          Y[I] = S;
        }
```

-24-

```
            Ex = TRUE;
            for (I = 1;I<=*M;I++)
              if (Y[I] >= *Eps)
                {
                  S = X[I] / Y[I];
                  if ((Ex)||(S < D))
                    {  D = S;   L = I;    }
                  Ex = FALSE;
                }
            if (Ex)
                {  *NoSol = TRUE;    Stop = TRUE;   }
              else
                {
                  W[L] = K;
                  S = 1.0 / Y[L];
                  for (J = 1;J<=*M;J++)
                     U[L][J] = U[L][J] * S;
                  if (L == 1)  I = 2;    else    I = 1;
                  do
                   {
                     S = Y[I];
                     X[I] = X[I] - D * S;
                     for (J = 1;J<=*M;J++)
                        U[I][J] = U[I][J] - U[L][J] * S;
                     if (I == L - 1)  I = I + 2;    else    I = I + 1;
                   }
                  while (I <= Q);
                  X[L] = D;
                }             /* NOT EX */
          }                   /*  D <= -Eps */
    }
  while (!Stop);
}                             /* PSimplex */
/*---------------------------------------------------------------------*/
```

What is claimed is:

1. A method for optimizing the energy efficiency of a lighting system including a plurality of light sources, including the steps of:

defining a set of parameters for the lighting system; and, using a linear programming technique, taking into account said set of parameters, to produce energy allocation output data which satisfies a total energy consumption constraint that the total energy allocated to the lighting system not exceed a target energy consumption level, and which is representative of an optimal allocation of energy to each of said light sources.

2. The method as set forth in claim 1, wherein the using step is carried out by formulating a linear programming problem in terms of a set of lighting system energy allocation constraints, converting said constraints into a set of constraint equations and a cost function, converting said constraint equations into a set of simultaneous linear equations, and then solving said set of simultaneous linear equations in such a manner as to minimize said cost function, to thereby produce said energy allocation output data.

3. The method as set forth in claim 1, wherein the using step is carried out by formulating a linear programming problem which includes a set of constraint equations representative of a set of lighting system energy allocation constraints, and a cost function representative of lighting system energy consumption, and then solving said linear programming problem in such a manner as to satisfy said total energy consumption constraint and each of said lighting system energy allocation constraints, while minimizing said cost function.

4. The method as set forth in claim 2, wherein said set of parameters includes a minimum and maximum brightness level for each of said light sources, and said set of lighting system energy allocation constraints includes a brightness range constraint that a brightness level of each of said light sources not be less than said minimum brightness level nor greater than said maximum brightness level.

5. The method as set forth in claim 4, wherein said energy allocation output data includes an optimal brightness level for each of said light sources.

6. The method as set forth in claim 5, wherein each of said light sources has a linear power efficiency coefficient representative of the energy efficiency thereof, and said set of lighting system energy allocation constraints includes a constraint that available energy be allocated to each of said light sources at least partially on the basis of said linear power efficiency coefficient thereof, with more energy efficient ones of said light sources being allocated more of said available energy than less energy efficient ones of said light sources.

7. The method as set forth in claim 5, wherein the lighting system is installed in a building which includes a set of rooms each equipped with at least one of said light sources, said set of parameters includes a designated priority level for each of said rooms, and said set of lighting system allocation constraints includes a constraint that available energy be allocated to each of said rooms at least partially on the basis of said designated priority level thereof, with higher priority ones of said rooms being allocated a greater amount of said available energy than lower priority ones of said rooms.

8. The method as set forth in claim 5, wherein said set of lighting system energy allocation constraints further includes an equal priority-equal energy constraint that said at least one light source in rooms with an equal priority level designation will be allocated an equal amount of available energy.

9. The method as set forth in claim 7, wherein said set of rooms includes a utility room and at least one connected room served thereby, and further comprising the step of processing said energy allocation output data to determine whether said optimal brightness level for each said connected room is equal to said minimum brightness level, and, if so, adjusting said optimal brightness level for said utility room to said minimum brightness level.

10. The method as set forth in claim 1, wherein said energy allocation output data includes an optimal brightness level for each of said light sources, and further comprising the step of using said energy allocation output data to adjust a brightness level of each of said light sources to said optimal brightness level.

11. A computer system comprising:

a processor; and computer software embodied in a storage medium, comprising:

lighting optimization means for defining a set of parameters for a lighting system having a plurality of light sources and a set of linear programming equations; and, linear programming means for solving said linear programming equations in such a manner as to produce energy allocation output data which satisfies a total energy consumption constraint that the total energy allocated to the lighting system not exceed a target energy consumption level, and which is representative of an optimal allocation of energy to each of said light sources.

12. The computer system as set forth in claim 11, wherein said set of linear programming equations includes a set of constraint equations representative of a set of lighting system energy allocation constraints, and a cost function representative of lighting system energy consumption.

13. The computer system as set forth in claim 12, wherein said linear programming means converts said set of constraint equations and said cost function into a set of simultaneous linear equations, and solves said set of simultaneous linear equations in such a manner as to satisfy said total energy consumption constraint and each of said lighting system energy allocation constraints, while minimizing said cost function.

14. The computer system as set forth in claim 13, wherein said set of parameters includes a minimum and maximum brightness level for each of said light sources, and said set of lighting system energy allocation constraints includes a brightness range constraint that a brightness level of each of said light sources not be less than said minimum brightness level nor greater than said maximum brightness level.

15. The computer system as set forth in claim 14, wherein said energy allocation output data includes an optimal brightness level for each of said light sources.

16. The computer system as set forth in claim 15, wherein each of said light sources has a linear power efficiency coefficient representative of the energy efficiency thereof, and said set of lighting system energy allocation constraints includes a constraint that available energy be allocated to each of said light sources at least partially on the basis of said linear power efficiency coefficient thereof, with more energy efficient ones of said light sources being allocated more of said available energy than less energy efficient ones of said light sources.

17. The computer system as set forth in claim 15, wherein the lighting system is installed in a building which includes a set of rooms each equipped with at least one of said light sources, said set of parameters includes a designated priority level for each of said rooms, and said set of lighting system allocation constraints includes a constraint that available energy be allocated to each of said rooms at least partially on the basis of said designated priority level thereof, with higher priority ones of said rooms being allocated a greater amount of said available energy than lower priority ones of said rooms.

18. The computer system as set forth in claim 17, wherein said set of lighting system energy allocation constraints further includes an equal priority-equal energy constraint that said at least one light source in rooms with an equal priority level designation will be allocated an equal amount of available energy.

19. The computer system as set forth in claim 17, wherein said set of rooms includes a utility room and at least one connected room served thereby, and further comprising an output filter module for processing said energy allocation output data to determine whether said optimal brightness level for each said connected room is equal to said minimum brightness level, and, if so, adjusting said optimal brightness level for said utility room to said minimum brightness level.

20. An intelligent lighting control system for a lighting system having a plurality of light sources, comprising:

a programmable controller;

computer system loaded into said programmable controller, said computer system including a lighting optimization code which defines a set of parameters for the lighting system and a set of linear programming equations, and a linear programming code for solving said linear programming equations in such a manner as to produce energy allocation output data which satisfies a total energy consumption constraint that the total energy allocated to the lighting system not exceed a target energy consumption level, and which is representative of an optimal allocation of energy to each of said light sources; and, wherein said programmable controller is responsive to said energy allocation output data for automatically controlling a brightness level of each of said light sources.

* * * * *